Figure 1:
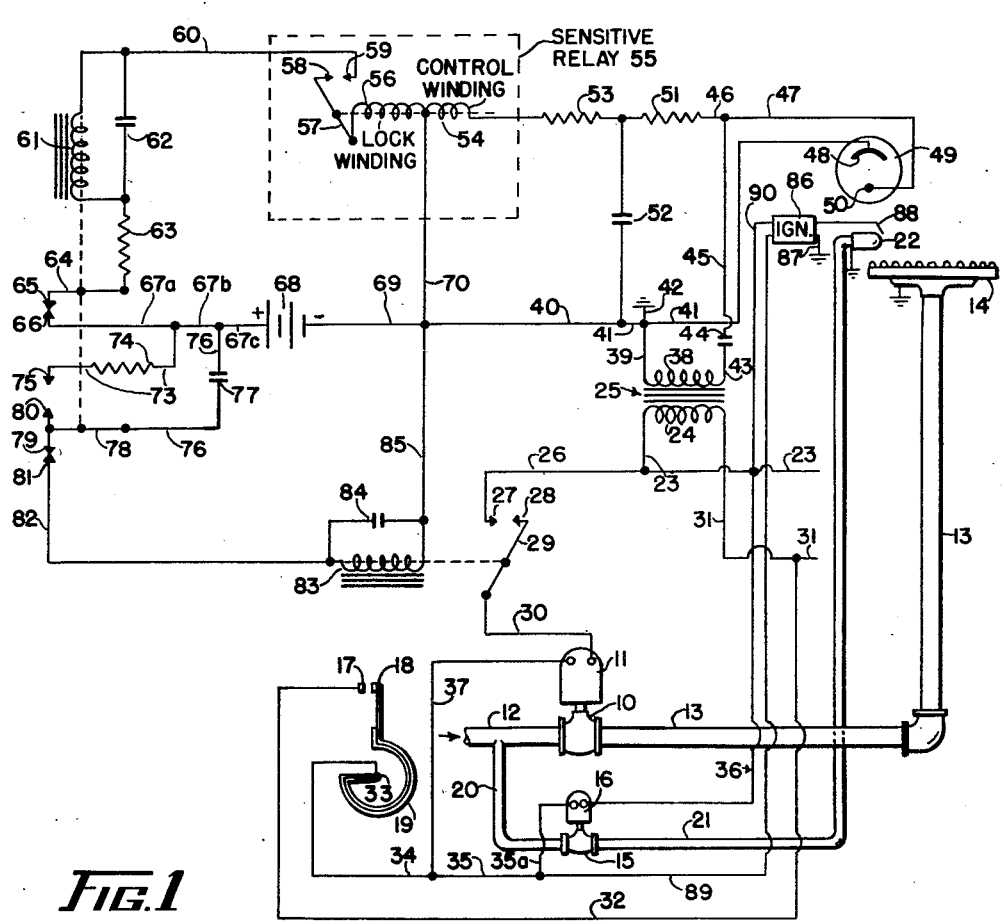

Nov. 26, 1957  H. J. SMITH  2,814,740

CONTROL APPARATUS

Original Filed Feb. 28, 1955

INVENTOR.
HARVEY J. SMITH
BY
ATTORNEY

United States Patent Office 2,814,740
Patented Nov. 26, 1957

2,814,740
CONTROL APPARATUS

Harvey J. Smith, St. Louis Park, Minn., assignor to Minneapolis-Honeywell Regulator Company, Minneapolis, Minn., a corporation of Delaware Continuation of abandoned application Serial No. 490,735, February 28, 1955. This application February 13, 1956, Serial No. 565,126

9 Claims. (Cl. 307—132)

This application is a continuation of application Serial No. 490,735, filed February 28, 1955, now abandoned.

This invention relates to control apparatus comprising, in essence, a condition sensing circuit, wherein the sensing element is a phototube or similar low current device, operable without other electronic discharge devices, to provide a constant pulsating check on the existence of the condition once such condition has been initiated, and automatic shutdown of a control device when such condition ceases to exist, or when the pulsations are interrupted.

In the field of flame detection, there are, generally speaking, two approaches available to detect the presence or absence of a flame. The first approach involves the use of a heat responsive device, such as a bimetal thermostat, to detect the presence or absence of a flame. Such a device is dependable because there are no components to wear out or fail; however, it has the drawback that its response to a failure of flame may be in the neighborhood of 90 seconds. This slow response feature is undesirable in such applications as gas furnace flame detectors, where during the 90 second response gap between no flame and a no flame signal, a prohibitive amount of gas may be discharged into the furnace setting up the possibility of explosion upon a re-ignition. The second approach is electronic. In such a system the presence or absence of flame is detected by a phototube or other low output signal device, and a signal of a few micro amperes is passed to an electronic discharge device operating as an amplifier, which amplifies the signal indicating the presence of a flame and passes this amplified signal to a relay which directly or indirectly governs the control device. This type of system has an excellent response time of approximately 2 to 4 seconds, but has the disadvantage that electronic discharge devices are susceptible to electrical and mechanical failure. A further drawback to the electronic system is the relatively high cost such a system involves.

The system of the present invention solves the problem of reliability, response, and cost by substituting for the electron discharge device of the electronic system mentioned above a supersensitive relay, such as is produced by the Assembly Product Company, which is operable by a few micro amperes of current, and thus can be operated by a phototube or similar device, to close a circuit allowing the necessary current to pass to a pulsating relay circuit which constantly checks the existence of the signal from the phototube. By incorporating a checking circuit, provision is made to drop out the control device if the pulsating should stop due to either lack of a signal from the phototube, or a mechanical or electrical failure in the system, which incapacitates the pulsing of the pulsating relay.

It is therefore an object of this invention to provide a control apparatus for sensing a condition without the need of an electronic discharge device.

A second object of this invention is to provide the above system with a pulsing action and automatic shutdown of a control device upon a failure of the pulsing action.

Another object of the invention is to provide a system with both rapid response and reliability.

A further object is to provide a system that is of a simple design and circuitry, and of relatively low cost.

Figure 2:
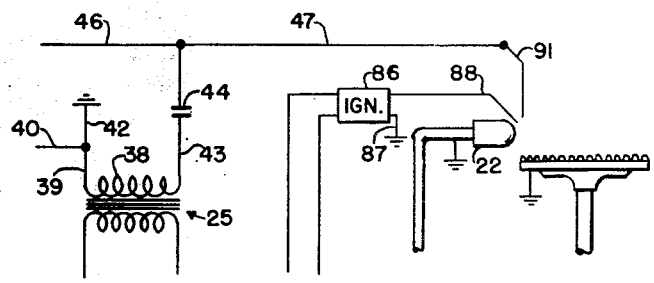

Other objects of the invention will be apparent from a consideration of the accompanying specification, claims and drawing in which:

Figure 1 is a schematic view of the condition sensing and pulsating circuit applied to a flame detector apparatus, and Figure 2 is a partial schematic view of the circuit of Figure 1 showing another form of a flame detector.

In Figure 1, a main gas valve 10 is electrically operated by a normally deenergized solenoid 11, which when energized allows the passage of fuel from an inlet pipe 12 to a connector 13 and thence to a gas burner 14. Pilot valve 15 is also electrically operated by a normally deenergized solenoid 16, which when energized by the closing of contacts 17 and 18 of a bimetal thermostat 19 causes passage of fuel from the inlet pipe 12 to a pilot valve inlet pipe 20, a pipe 21, and a pilot burner 22. Connected in parallel across the pilot valve 15 by means of conductors 89 and 90 is an ignition transformer 86, grounded at 87 and connected with an ignition electrode 88.

From an alternating current electrical power source, not shown, a power lead 23 connects with one side of a primary winding 24 of a transformer 25. Conductor 26 connects with power lead 23 at one extremity, and has a contact 27 at its other extremity which engages contact 28 of a normally open switch 29 when said switch is closed. Lead 30 connects the switch 29 with the solenoid 11. The other power lead 31 is connected to the primary winding 24. Conductor 32, extending from a junction with power lead 31, is connected to contact 17, so that when the contacts 17 and 18 close, the thermostat 19 is placed in series with the solenoid 16 by means of a connection 33 and conductors 34, 35, and 35a. From solenoid 16, lead 36 connects with primary lead 23.

From the junction of conductors 34 and 35, lead 37 connects to solenoid 11, thereby placing solenoid 11 in parallel with solenoid 16, and the solenoids 11 and 16 in series with the thermostat 19, all of which are connected across the power supply, not shown.

Conductor 39 leading from a secondary winding 38 of the transformer 25, makes a junction with lead 41 and is then grounded at 42. Conductor 43 leads from the other end of the secondary winding 38 to a capacitor 44, from which conductor 45 leads to a junction with leads 46 and 47. Lead 41 is attached to a cathode element 48 of a rectifying phototube 49, so placed that it can detect the existence of a pilot burner flame from the pilot burner 22. Lead 47 is attached to an anode 50 of the phototube 49. In series with the secondary winding 38 is a resistor 51 and across the secondary winding 38 is a capacitor 52. A resistor 53 is placed in series with a control winding 54 of a sensitive relay 55. A lock winding 56 is electrically connected to a normally open switch 57 having a contact 58 which is actuated by the control winding 54 when energized. Said switch 57 is additionally actuated by winding 56 when energized to increase contact pressure. Contact 59 is attached to one end of lead 60, the other end being attached to relay winding 61, across which capacitor 62 is placed. In series with the relay winding 61 and capacitor 62 is a resistor 63, which leads to switch 64, having a contact 65, whose position is controlled by relay winding 61. Contact 66 is attached to one end of lead 67a, the other end of lead 67a being attached to lead 67b, which in turn is connected to lead 67c which connects to a terminal of a source of direct current power 68. The other terminal of the direct current power source has a lead 69 connected thereto that makes a junction with lead 70, from whence lead 70 connects to the junction of the lock winding 56 and control winding 54 of the sensitive relay 55.

Interposed between the contact 66 and the direct current power source 68 is a lead 73, connected to the junction of leads 67a and 67b, having a resistor 74, and a contact 75 disposed at one extremity. Also interposed between the contact 66 and the direct current power source 68, and connected to the junction of leads 67b and 67c, is another lead 76 having a capacitor 77, and which is connected to a switch 78 having contacts 79 and 80, whose position is controlled by relay winding 61. Contact 81 is attached to lead 82 which is connected to a main gas valve relay winding 83, across which is placed a capacitor 84. Conductor 85 connects the other side of the relay winding 83 and the capacitor 84 with a direct current power terminal and direct current power source 68 by means of lead 69.

Assuming the system is in the condition shown in the schematic view, the operation thereof is as follows: As the contacts 17 and 18 close, thereby setting up a demand for heat, a circuit is closed and current from the power leads 23 and 31 passes through the lead 32, contacts 17, 18 and 19, lead 34, lead 35, lead 35a, and lead 36, causing solenoid 16 to open the pilot valve 15, thus allowing fuel to pass from the inlet pipe 12 through the pilot valve inlet pipe 20, pilot valve 15, pipe 21, and pilot burner 22. The circuit closed by the thermostat contacts 17 and 18 also passes current through the ignition transformer 86, by means of conductors 89 and 90, thus allowing electrode 88 to ignite the fuel discharging from the pilot burner 22. Since the switch 29 is still open, solenoid 11 cannot be energized at this time. At the appearance of the flame, the phototube 49, which has a voltage impressed across it at all times from the secondary winding 38, passes a direct current signal from the cathode 48 to the anode 50 which is filtered by the capacitor 52. The filtered signal energizes the control winding 54 of the sensitive relay 55, causing switch 57 to pull in, closing the contacts 58 and 59. The closing of the contacts 58 and 59 produces a closed lock circuit or loop, from which direct current from a direct current power source 68 can charge capacitor 62 and flow through leads 69 and 70, lock winding 56, switch 57, contacts 58 and 59, lead 60, relay winding 61, resistor 63, switch 64, contacts 65 and 66, and leads 67a, b and c back to the direct current power source 68. The closing of contacts 58 and 59 also causes the charging of capacitor 62. This direct current flow through the lock winding 56 causes the switch contacts 58 and 59 to be held together with enough pressure to allow the current necessary to energize relay winding 61 to pass therethrough, and this action is independent of energization of control winding 54. As the current energizes relay winding 61, switch 64 is raised breaking the contacts 65 and 66, and hence the lock circuit mentioned above is broken and the lock winding 56 is deenergized. This returns the control of switch 57 to control winding 54. Normally control winding 54 remains energized. However, should the phototube 49 fail to "see" light and thus send no signal to the control winding 54, this winding is deenergized and switch 57 opens. The opening of the circuit containing the lock winding 56 does not immediately cause the switch 64 to close, as the charge on capacitor 62 causes a current flow through relay winding 61 to continue, momentarily, its energization. However, when the capacitor 62 is discharged to such an extent that the current flow, and thus the energization, through the relay winding 61 can no longer hold the switch 64 open, the switch 64 then drops out and closes, and the direct current circuit described above is once more closed, and the "locking-relay opening" process is repeated. The pulse repetition rate depends on the discharge rate of capacitor 62 and the continued signal to control winding 54 from the phototube 49.

A checking circuit, which includes a main gas valve relay winding 83, is included in the system and is comprised of the direct current power source 68, leads 69 and 85, relay winding 83, capacitor 84, lead 82, switch 78, leads 73 and 76, capacitor 77, resistor 74, and leads 67b and 67c. The function of this circuit is to maintain the main gas valve relay winding 83 energized only if the phototube 49 passes a signal to the control coil 54 causing its energization, and if the lock circuit continues to pulse, that is, if it continues to open and close. Thus if the lock circuit fails to pulse due to a mechanical failure, sticking of contacts, direct current power failure, etc., even though the phototube 49 has passed a signal energizing the control coil 54, the main gas valve relay winding 83 will be deenergized and the main gas valve 10 will close, due to the opening of switch 29.

To achieve the function desired, it is necessary that the time constant of relay winding 61 and capacitor 62 be less than the time constant of relay winding 83 and capacitor 84, to the extent that the relative time constants allow the relay 61 to be energized thereby breaking the lock circuit, causing discharge of the capacitor 62 through relay winding 61, thereby reclosing the lock circuit in a space of time less than the time required to fully discharge the capacitor 84. This condition is required so that capacitor 84 is never discharged to such an extent that relay winding 83 becomes partially or totally deenergized, so as to allow flutter or opening of switch 29 while relay winding 61 is pulsatingly being energized and deenergized.

With the thermostat 19 open and not asking for heat, the circuit is as shown and capacitor 84 has no charge, as the charge it had when last energized has been dissipated through relay winding 83, while capacitor 77 is fully charged by the direct current power source 68, thus allowing no current flow through the checking circuit under the circumstances. However, when the thermostat 19 asks for heat, with the consequent lighting of the pilot burner 22, the energization of the control coil 54 closing switch 57, and the energization of relay winding 61, switch 78, which is under the control of relay winding 61, opens contacts 81 and 79 and closes contacts 75 and 80, making a circuit between resistor 74 and capacitor 77, which causes a discharge of capacitor 77. This portion of the cycle causes a difference in potential between capacitors 77 and 84 and the direct current power source 68 so that when a circuit containing all of them is re-established, due to the discharge of capacitor 62 and resultant deenergization of relay winding 61 with the consequent movement of switch 78 reclosing contacts 80 and 81, a current will flow in said circuit charging capacitors 77 and 84 and energizing relay winding 83 thus closing switch 29 and thereby completing the circuit containing solenoid 11. Solenoid 11 is then energized opening main gas valve 10 and allowing fuel flow to burner 14.

As long as the lock circuit continues to pulse, causing relay winding 61 to be energized and then deenergized successively, as described previously, thus moving switch 78 to successively and alternately open and close the set of contacts 75 and 80 and the set of contacts 79 and 81, causing, thereby, discharge of capacitor 77 when in series with resistance 74, followed by charging of capacitors 77 and 84 when they are in series, the relay winding 83 will remain energized and switch 29 will remain closed. However, should the pulsating energization of relay winding 61 cease, due to malfunctioning, and not due to failure of a phototube signal to the control winding 54, and switch 64 remain either open or closed, capacitor 84 will soon lose its charge to relay winding 83. When switch 64 remains closed, relay winding 83 will become deenergized after capacitor 62 is discharged, as capacitor 77 will remain fully charged and thus no current can flow in the checking circuit. The deenergization of relay winding 83 causes switch 29 to open, shutting down the main gas valve 10, as solenoid 11 is deenergized thereby, and this even though the phototube receives light from the pilot burner 22 and passes a signal to the sensitive relay 55. If the switch 64 should remain open, it is apparent no circuit would be completed between the direct current power source 68 and the relay winding as contacts 79 and 81 would remain open, thus switch 29 would open as soon as the capacitor 84 were discharged to the point it could no longer energize relay winding 83 to the extent necessary to hold switch 29 closed.

It is of course apparent, that any failure of component parts such as the phototube, sensitive relay, or break in the circuit, etc., stops the necessary pulsing and therefore stops the main gas flow to the burner 14.

In Figure 2, a secondary winding 38 of transformer 25 has one side thereof connected to capacitor 44 by means of conductor 43. To the other side of capacitor 44, a conductor 45 is attached which forms a junction with leads 46 and 47. Lead 47 has a flame rod 91 at one extremity thereof. The other side of the secondary winding 38 makes a junction with lead 40 by means of conductor 39 and is thence grounded at 42. Ignition transformer 86, grounded at 87, has electrode 88 extending therefrom as in Figure 1. Pilot burner 22 is placed proximately near electrode 88 and flame rod 91.

Flame rod 91, when exposed to a flame from the pilot burner 22, passes a small current through lead 47 to the sensitive relay, not shown, thus starting the cycle described in conjunction with Figure 1.

It is obvious that modifications other than those described may be made. Therefore, the scope of the invention should be determined from the following claims.

I claim:

1. In a condition detection system for a control device, a phototube loop, a pulse locking loop, and a checking circuit; said phototube loop comprising a rectifying phototube with an alternating current voltage impressed thereon and a sensitive relay controlled by said phototube, said phototube being operable upon the occurrence of a predetermined condition to cause current passage in said phototube loop and energization and closure of said sensitive relay; said pulse locking loop having a direct current voltage impressed thereon and comprising a first relay winding having a capacitor in parallel therewith, a normally closed switch operable by said first relay winding, and a lock winding for said sensitive relay, said pulse locking loop being controlled by said sensitive relay such that closure of said sensitive relay causes an instantaneous energization of said first relay winding and said locking winding; said checking circuit having a second switch operable by said first relay winding and having a first loop with a resistor and capacitor therein and a second loop having a direct current voltage impressed thereon and having the capacitor of said first loop and a second capacitor having a second relay winding in parallel therewith for actuating said control device, said first and second loops being alternately opened and closed by said second switch.

2. In a condition detection system, the combination comprising a phototube loop and a pulse locking loop; said phototube loop comprising a rectifying phototube with an alternating current voltage impressed thereon and a sensitive relay controlled by said phototube, said phototube being operable when a predetermined condition exists to cause current passage in said phototube loop and energization and closure of said sensitive relay; said pulse locking loop having a direct current voltage impressed thereon and comprising a relay winding having a capacitor in parallel therewith, a normally closed switch operable by said relay winding, a device having a resistance, and a lock winding for said sensitive relay; said pulse locking loop being controlled by said sensitive relay so that closure of said sensitive relay causes an instantaneous energization of said relay winding, said device, and said lock winding.

3. In a flame detection system for a control device, a flame rod loop, a pulse locking loop, and a checking circuit; said flame rod loop comprising a rectifying flame rod with an electrical voltage impressed thereon and a sensitive relay controlled by said flame rod, said flame rod being operable when subjected to a flame to cause current passage in said flame rod loop and energization and closure of said sensitive relay; said pulse locking loop having a direct current voltage impressed thereon and comprising a first relay winding having a capacitor in parallel therewith, a normally closed switch operable by said first relay winding and a lock winding for said sensitive relay, said pulse locking loop being controlled by said sensitive relay such that closure of said sensitive relay causes an instantaneous energization of said first relay winding and said lock winding; said checking circuit having a second switch operable by said first relay winding and having a first loop with a resistor and capacitor therein and a second loop having a direct current voltage impressed thereon and having the capacitor of said first loop and a second capacitor having a second relay winding in parallel therewith for actuating said control device, said first and second loops being alternately opened and closed by said second switch.

4. In a flame detection system, the combination comprising: a flame rod loop having a rectifying flame rod with an electrical voltage impressed thereon and a sensitive relay controlled by said flame rod, said flame rod being operable when subjected to a flame to cause current passage in said flame rod loop and energization and closure of said sensitive relay; and a pulse locking loop having a direct current voltage impressed thereon, a relay winding having a capacitor in parallel therewith, a normally closed switch operable by said relay winding, a device having resistance, and a lock winding for said sensitive relay, said pulse locking loop being controlled by said sensitive relay so that closure of said sensitive relay causes an instantaneous energization of said first relay winding, said device, and said lock winding.

5. In a control system, the combination comprising a condition sensing loop, a pulse locking loop, a checking circuit, and a control device; said condition sensing loop comprising a condition sensing electron discharge device with an electrical voltage impressed thereon and a sensitive relay controlled by said condition sensing electron discharge device, said condition sensing electron discharge device being operable on a condition to cause current passage in said condition sensing loop and energization and closure of said sensitive relay; said pulse locking loop having a direct current voltage impressed thereon and comprising a first electrically operated actuating means, a normally closed first loop opening and closing means, said first actuating means causing instantaneous movement of said first loop opening and closing means in one direction when energized but said first loop opening and closing means being delayed in movement in the opposite direction when said first actuating means becomes deenergized, and an electrically operated locking means for said sensitive relay, said pulse locking loop being controlled by said sensitive relay such that closure of said sensitive relay causes an instantaneous energization of said first actuating means and said locking means; said checking circuit having two loops in parallel, a second loop opening and closing means operable by said first actuating means to alternately open and close each loop, said two loops comprising a first resistive capacitance loop and a second loop having a direct current voltage impressed thereon and having the capacitance of the first loop and a second electrically operated actuating means for actuating said control device, said second actuating means having a time delay means operable to maintain the actuated condition after the cessation of current flow of said second loop.

6. In control apparatus, the combination comprising a condition sensing loop and a pulse locking loop; said condition sensing loop comprising a condition sensing electron discharge device with an electrical voltage impressed thereon and a sensitive relay controlled by said condition sensing electron discharge device, said condition sensing electron discharge device being operable upon the occurrence of a condition to cause current passage in said condition sensing loop and energization and closure of said sensitive relay; said pulse locking loop having a direct current voltage impressed thereon and comprising an electrically operated actuating means, a normally closed loop opening and closing means, said actuating means causing instantaneous movement of said loop opening and closing means in one direction when energized but said loop opening and closing being delayed in movement in the opposite direction when said actuating means is deenergized, a device having resistance, and an electrically operated locking means for said sensitive relay, said pulse locking loop being controlled by said sensitive relay so that closure of said sensitive relay causes an instantaneous energization of said actuating means, said last named device, and said locking means.

7. In combination; a condition sensing loop and a pulse locking loop, said condition sensing loop comprising a condition sensing electron discharge device with an electrical voltage impressed thereon and a sensitive relay controlled by said condition sensing electron discharge device, said condition sensing electron discharge device being operable upon the occurrence of a condition to cause current passage in said condition sensing loop and energization and closure of said sensitive relay; said pulse locking loop having a direct current voltage impressed thereon and comprising an electrically operated actuating means, a normally closed loop opening and closing means, said actuating means causing instantaneous movement of said loop opening and closing means in one direction when energized but said loop opening and closing means being delayed in movement in the opposite direction when said actuating means is deenergized, and locking means for said sensitive relay, said pulse locking loop being controlled by said sensitive relay so that closure of said sensitive relay causes substantially an instantaneous energization of said actuating means and said locking means.

8. In combination, a condition sensing loop, a pulse locking loop, a checking circuit, and a control device; said condition sensing loop comprising a condition sensing device and a sensitive relay, said condition sensing device being operable upon the occurrence of a condition to cause current passage in said condition sensing loop and thereby energization and closure of said sensitive relay; said pulse locking loop having a voltage impressed thereon and comprising a first electrically operated actuating means, a normally closed first loop opening and closing means, said first actuating means causing instantaneous movement of said first loop opening and closing means in one direction when energized but said first loop opening and closing means being delayed in movement in the opposite direction when said first actuating means is deenergized, and locking means for said sensitive relay, said pulse locking loop being controlled by said sensitive relay so that closure of said sensitive relay causes substantially an instantaneous energization of said first actuating means and said locking means; said checking circuit comprising two loops and including a second loop opening and closing means operable by said first actuating means to alternately open and close each loop, a first loop including an electrical energy storing means, and a second loop having a voltage impressed thereon and including said electrical storing means and a second electrically operated actuating means having time delay, said second electrically operated actuating means for actuating said control device and operable to maintain for a time delay period the actuated condition after the cessation of current flow in said second loop.

9. In combination, a condition sensing loop and a pulse locking loop; said condition sensing loop comprising a condition sensing means and a sensitive relay, said condition sensing means being operable upon the occurrence of a condition to cause current passage in said condition sensing loop and thereby energization and closure of said sensitive relay; said pulse locking loop having a voltage impressed thereon and comprising an electrically operated actuating means, a normally closed loop opening and closing means, said actuating means causing instantaneous movement of said loop opening and closing means in one direction when energized but said loop opening and closing means being delayed in movement in the opposite direction when said actuating means is de-energized, and locking means for said sensitive relay, said pulse locking loop being controlled by said sensitive relay so that closure of said sensitive relay causes a substantially instantaneous energization of said actuating means and said locking means.

No references cited.